United States Patent
Benoit et al.

(10) Patent No.: US 11,829,024 B2
(45) Date of Patent: Nov. 28, 2023

(54) DISPLAY OPTICAL FILM AND BACKLIGHT UNIT

(71) Applicant: 3M INNOVATIVE PROPERTIES COMPANY, St. Paul, MN (US)

(72) Inventors: Gilles J. Benoit, Minneapolis, MN (US); Carl A. Stover, St. Paul, MN (US); Matthew B. Johnson, Woodbury, MN (US); Ryan T. Fabick, Shoreview, MN (US); Quinn D. Sanford, Mosinee, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 106 days.

(21) Appl. No.: 17/435,203

(22) PCT Filed: Feb. 18, 2020

(86) PCT No.: PCT/IB2020/051339
§ 371 (c)(1),
(2) Date: Aug. 31, 2021

(87) PCT Pub. No.: WO2020/183260
PCT Pub. Date: Sep. 17, 2020

(65) Prior Publication Data
US 2022/0137455 A1 May 5, 2022

Related U.S. Application Data

(60) Provisional application No. 62/815,468, filed on Mar. 8, 2019.

(51) Int. Cl.
*G02F 1/1335* (2006.01)
*G02F 1/13357* (2006.01)

(52) U.S. Cl.
CPC .. *G02F 1/133533* (2013.01); *G02F 1/133605* (2013.01)

(58) Field of Classification Search
CPC ......... G02F 1/133533; G02F 1/133605; G02F 1/13362; G02F 1/133536; G02F 1/133603; G02F 1/133606; G02B 5/305
See application file for complete search history.

(56) References Cited

U.S. PATENT DOCUMENTS

2006/0039152 A1* 2/2006 Ito ............... G02F 1/133617
362/318
2016/0085102 A1 3/2016 Ohmuro
(Continued)

FOREIGN PATENT DOCUMENTS

JP 2013003409 A 1/2013
JP 2013250472 A 12/2013
(Continued)

OTHER PUBLICATIONS

International Search Report for PCT International Application No. PCT/IB2020/051339, dated Jul. 24, 2020, 5 pages.

*Primary Examiner* — Donald L Raleigh
(74) *Attorney, Agent, or Firm* — Jonathan L. Tolstedt

(57) ABSTRACT

An optical stack for reflecting and transmitting light in a predetermined wavelength range includes stacked first and second optical films, the predetermined wavelength range defining a first wavelength range and a remaining wavelength range. For normally incident light and for each wavelength in a first wavelength range, the first optical film substantially reflects light having a first polarization state, and substantially transmits light having a second polarization state. For each of the first and second polarization states, for wavelengths in the first wavelength range, the second optical film has a maximum optical transmittance Tmax for light incident at a first incident angle, and an optical trans-
(Continued)

mittance Tmax/2 for light incident at a second incident angle, where the second incident angle is greater than the first incident angle by less than about 50 degrees. For wavelengths in the remaining wavelength range, the second optical film reflects at least 80% of light.

15 Claims, 8 Drawing Sheets

(56) References Cited

U.S. PATENT DOCUMENTS

2016/0370534 A1  12/2016  Liu et al.
2018/0172887 A1* 6/2018  Ko .................... G02F 1/133528

FOREIGN PATENT DOCUMENTS

KR    1020160081606    7/2016
WO       1995017303 A1    6/1995
WO    WO-2019016813 A1 *   1/2019  ........... G02B 6/0015

* cited by examiner

DISPLAY OPTICAL FILM AND BACKLIGHT UNIT

CROSS REFERENCE TO RELATED APPLICATIONS

This application is a national stage filing under 35 U.S.C. 371 of PCT/IB2020/051339, filed Feb. 18, 2021, which claims the benefit of Provisional Application No. 62/815,468, filed Mar. 8, 2019, the disclosure of which is incorporated by reference in its/their entirety herein.

SUMMARY

In some aspects of the present description, an optical stack for reflecting and transmitting light in a predetermined wavelength range is provided. In some embodiments, the predetermined wavelength range may extend at least from about 400 nanometers (nm) to about 600 nm, and may define a first wavelength range within the predetermined wavelength range, and a remaining wavelength range within the predetermined wavelength range. The optical stack may include stacked first and second optical films, such that, for substantially normally incident light and for each wavelength in at least the first wavelength range, the first optical film reflects at least 80% of light having a first polarization state, $P_x$, and transmits at least 80% of light having an orthogonal second polarization state, $P_y$. For each of the first and second polarization states, for each wavelength in the first wavelength range, the second optical film has a maximum optical transmittance $T_{max}$ for light incident at a first incident angle ($\theta 1$), and an optical transmittance $T_{max}/2$ for light incident at a second incident angle ($\theta 2$), where the second incident angle is greater than the first incident angle by less than about 50 degrees. For each wavelength in the remaining wavelength range, the second optical film reflects at least 80% of light.

In some aspects of the present description, a backlight for providing illumination to a display panel is provided. In some embodiments, the backlight may be configured to emit light substantially in a single primary color wavelength range of a visible spectrum. The emitted light may be substantially collimated and have a half angle divergence (a) of less than about 50 degrees.

DETAILED DESCRIPTION

Figure 1:
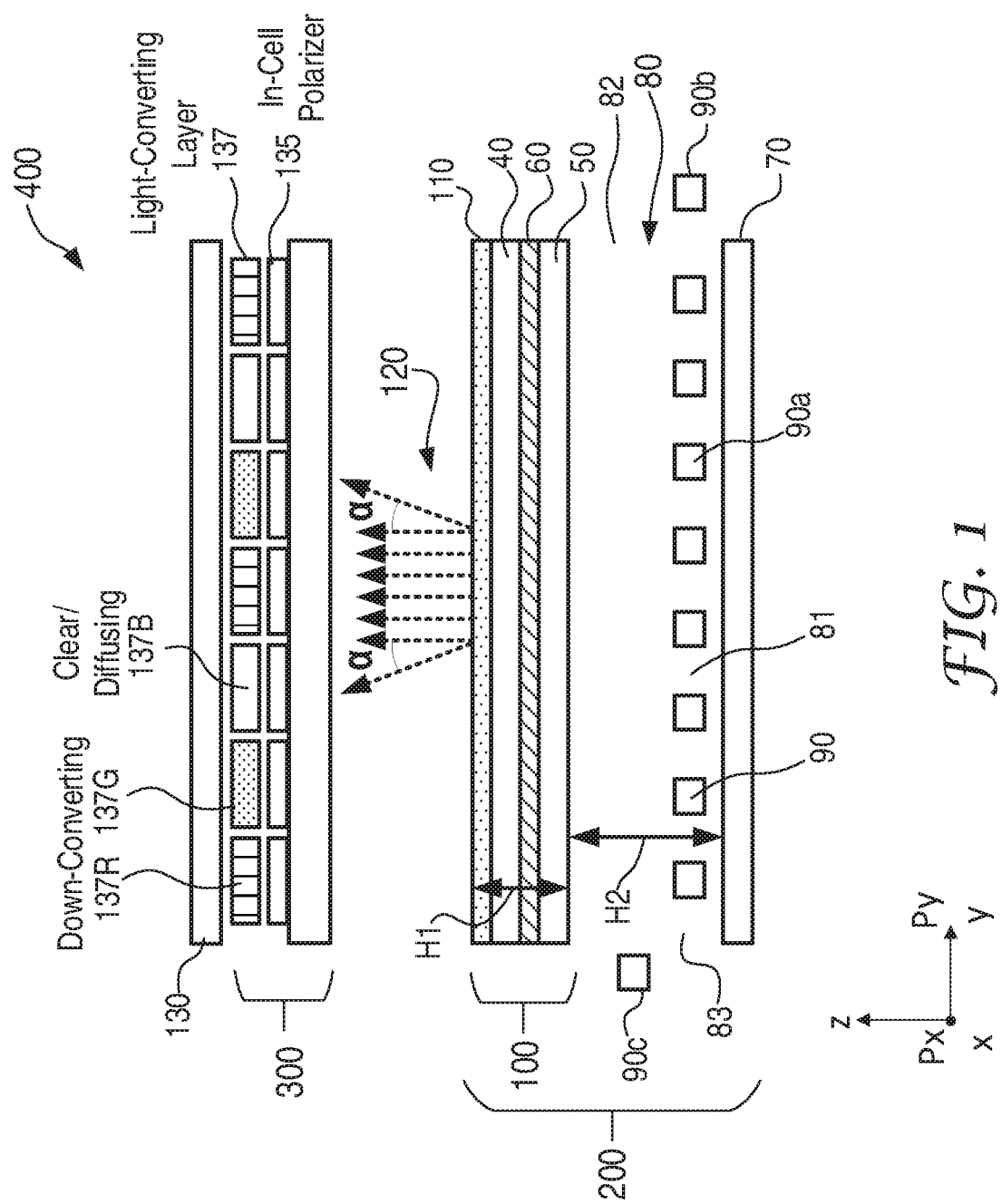
FIG. 1 is a cross-sectional view of an LCD display, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Backlight technology for liquid crystal displays (LCDs) is progressively migrating toward high dynamic range (HDR) displays using mini and/or micro light-emitting diodes (LEDs) in an effort to match the performance of organic LED (OLED) displays in regard to color and contract performance. In addition, the industry is beginning to replace traditional white backlights with color-by-blue backlights, in which only LEDs which emit blue wavelengths of light are used in the backlight unit, and "down-conversion" sheets with narrow emitting phosphors and/or quantum dots are used to convert the blue-only light into white light. There are several advantages to a blue-only backlight, including simplified manufacturing, simplified architectures, lower system costs, etc. Finally, LCD panel manufacturers have demonstrated replacing the traditional, color-absorbing filters of an LCD with down-converting filters (i.e., deposition of the down-converting material directly into the panel, rather than a standalone sheet.) Moving the down-converting material into the LCD panel requires the development of an in-cell polarizer. This progression in LCD technology provides a number of opportunities for non-traditional solutions in LCD backlights, including optical film and backlight architectures optimized specifically for blue-only backlight units, as described herein.

According to some aspects of the present description, an optical stack for reflecting and transmitting light in a predetermined wavelength range is provided. In some embodiments, the predetermined wavelength range may extend at least from about 400 nm to about 600 nm, and may define a first wavelength range within the predetermined wavelength range, and a remaining wavelength range within the predetermined wavelength range. In some embodiments, the first wavelength range may extend from about 400 nm to about 480 nm, representing primarily blue wavelengths of light.

The optical stack may include stacked first and second optical films. In some embodiments, the first optical film may be a reflective polarizer. In some embodiments, the reflective polarizer may be optimized for wavelengths of light corresponding to the first wavelength range (e.g., human-visible blue light or a subset thereof). In some embodiments, for substantially normally incident light and for each wavelength in at least the first wavelength range, the first optical film may reflect at least 80% of light having a first polarization state, $P_x$, and may transmit at least 80% of light having an orthogonal second polarization state, $P_y$. In some embodiments, $P_x$ may represent light of a linear s-polarization type, and $P_y$ may represent light of a linear p-polarization type. In other embodiments, Px may represent light of a linear p-polarization type, and Py may represent light of a linear s-polarization type. However, $P_x$ and $P_y$ may be any appropriate, different, orthogonal polarization types.

In some embodiments, the second optical film may be a collimating multilayer optical film. In some embodiments, the collimating multilayer optical film may be optimized for wavelengths of light corresponding to the first wavelength range (e.g., human-visible blue light or a subset thereof), and may substantially reflect wavelengths of light corresponding to the remaining wavelength range (e.g., human-visible red and green light, or subsets thereof). In some embodiments, for each of the first and second polarization states, and for each wavelength in the first wavelength range, the second optical film may have a maximum optical transmittance $T_{max}$ for light incident at a first incident angle (θ1), and an optical transmittance $T_{max}/2$ for light incident at a second incident angle (θ2), where the second incident angle is greater than the first incident angle by less than about 50 degrees. For each wavelength in the remaining wavelength range, the second optical film may reflect at least 80% of light.

According to some aspects of the present description, a backlight for providing illumination to a display panel is provided. In some embodiments, the backlight may be configured to emit light substantially in a single primary color wavelength range of a visible spectrum (e.g., wavelengths corresponding to human-visible blue light). The emitted light may be substantially collimated and have a half angle divergence (a) of less than about 50 degrees. In some embodiments, the single primary color wavelength range may be a blue wavelength range. In some embodiments, the light emitted by the backlight may be substantially linearly polarized. For example, the light emitted by the backlight may be of a linear polarization type (e.g., s-pol light, or p-pol light) which may be selectively blocked or transmitted by an LCD module to create an image on a display. In some embodiments, the light emitted by the backlight may have a first emitted light portion having a first polarization state, $P_x$, and a first intensity, and a second emitted light portion having an orthogonal second polarization state, $P_y$, and a second intensity, such that a ratio of the second intensity to the first intensity is greater than about 10.

Figure 5:
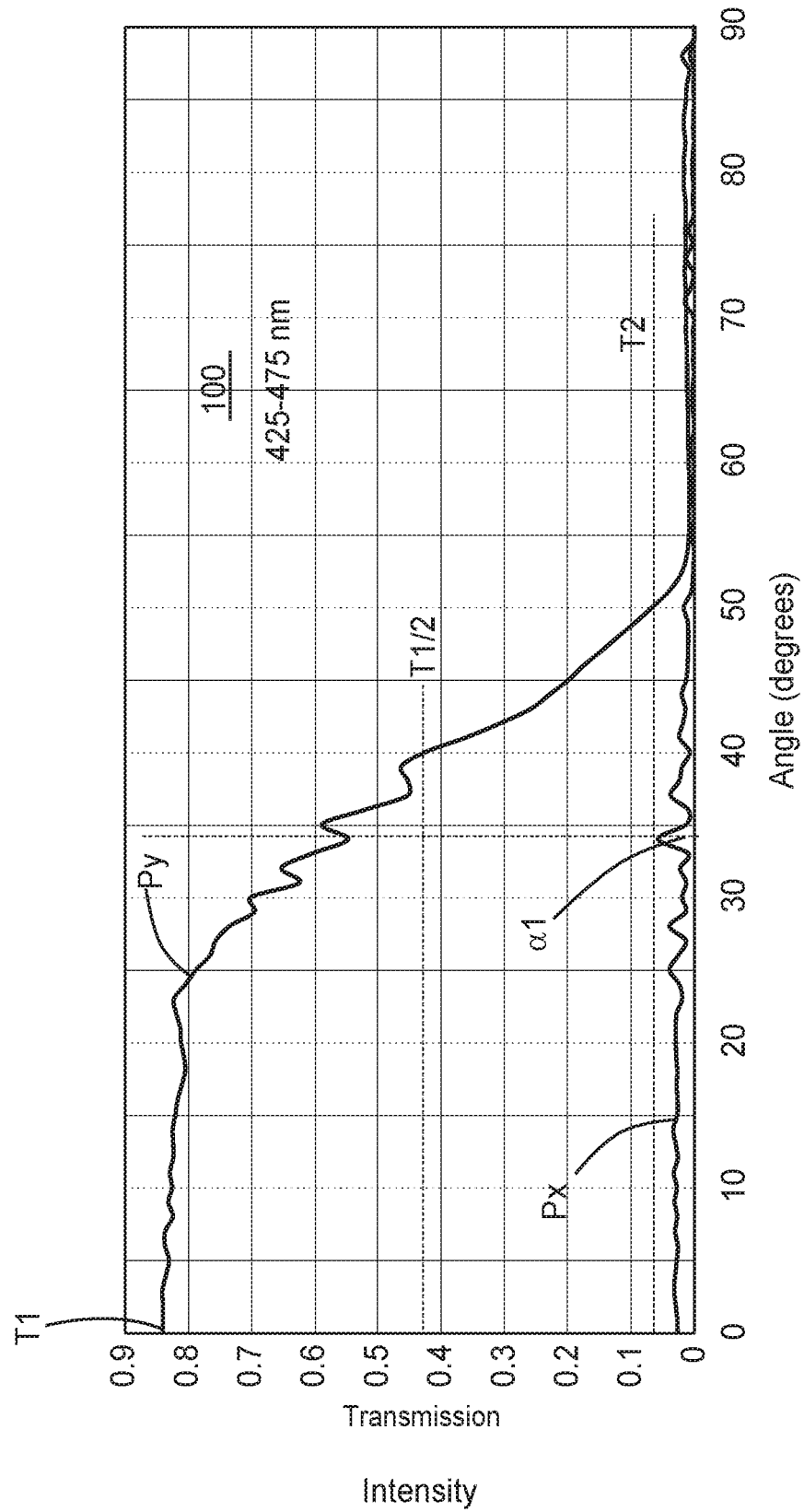
FIG. 5 illustrates the transmission of an optical stack for blue wavelengths of light, in accordance with an embodiment of the present description.
Figure 6:
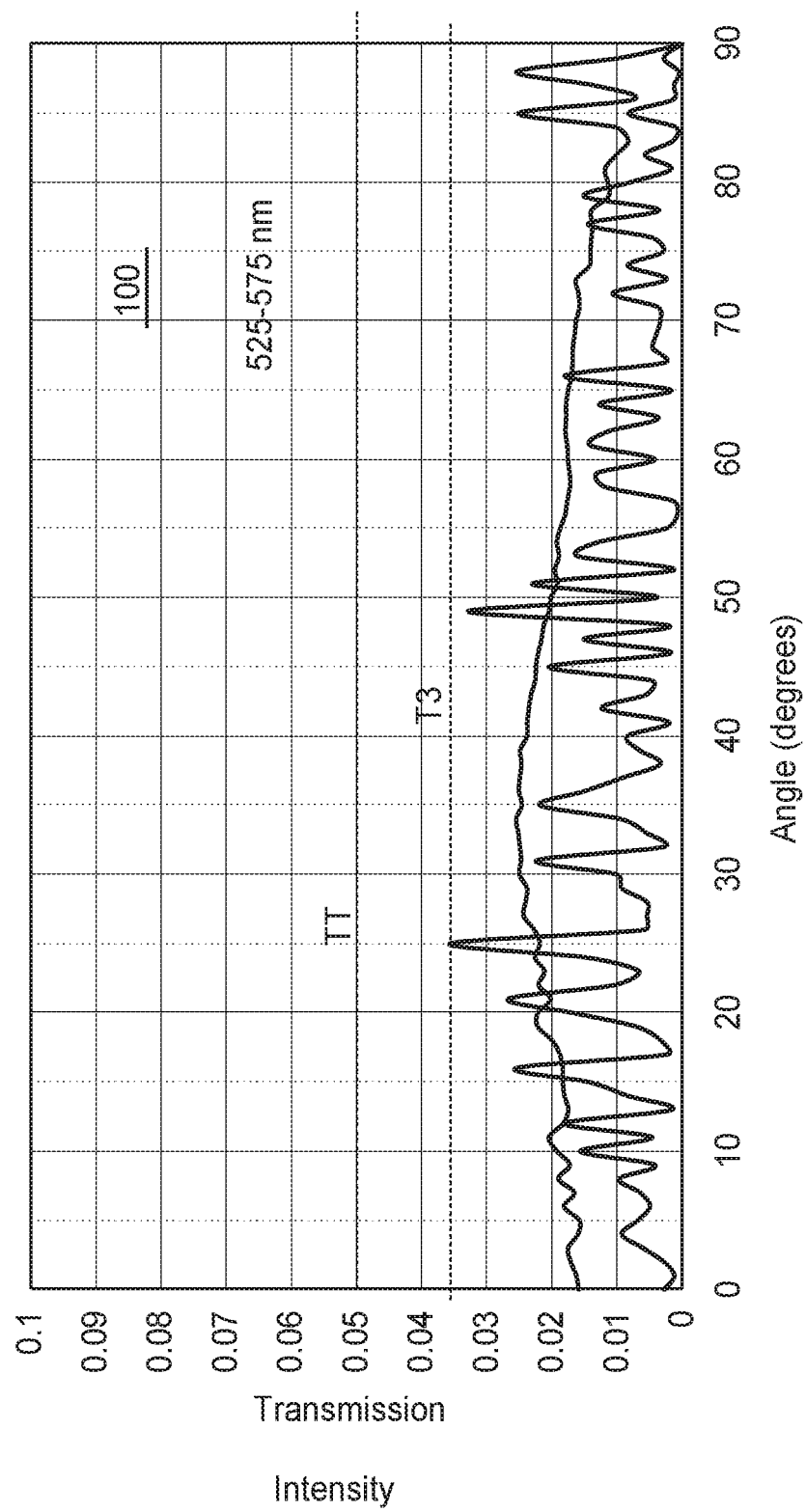
FIG. 6 illustrates the transmission of an optical stack for green wavelengths of light, in accordance with an embodiment of the present description.
Figure 7:
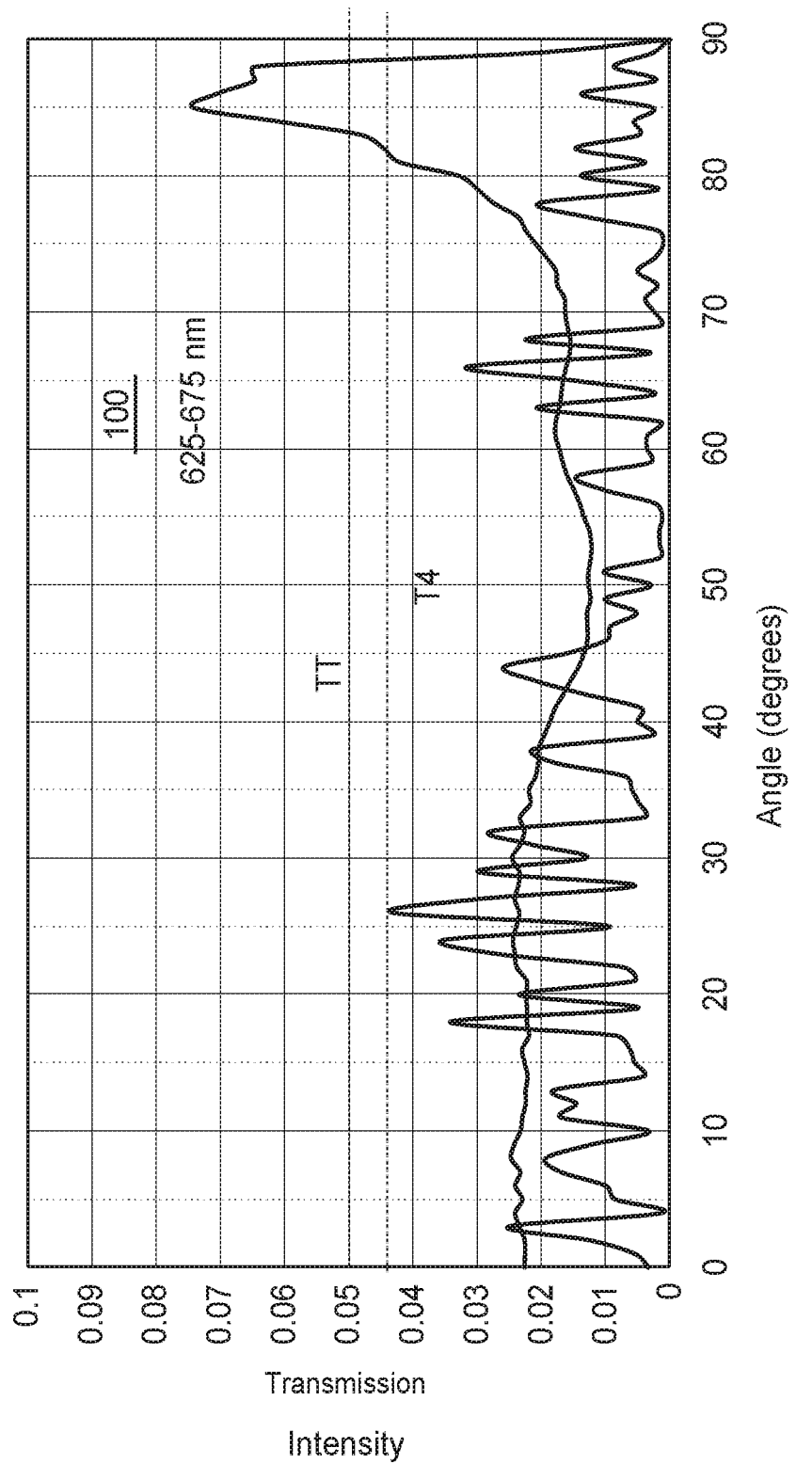
FIG. 7 illustrates the transmission of an optical stack for red wavelengths of light, in accordance with an embodiment of the present description.

In some embodiments, the backlight of FIG. 1 may be configured to emit substantially linearly polarized blue light, such that light emitted by the backlight in a blue wavelength range (e.g., extending from about 425 nm to about 475 nm) and having a first polarization state, $P_x$, has a maximum intensity T1 along a normal direction substantially normal to the backlight and a half angle divergence (α1) of less than about 45 degrees, and such that light emitted by the backlight in the blue wavelength range having an orthogonal second polarization state, $P_y$, and propagating within a first angular range making angles from about zero to about 70 degrees with respect to the normal direction, has a maximum optical transmittance T2, and for light for each of the first and second polarization states and propagating within the first angular range, the light has a maximum optical transmittance T3, for a green wavelength range extending from about 525 nm to about 575 nm, and T4, for a red wavelength range extending from about 625 nm to about 675 nm, wherein each of T1/T2, T1/T3 and T1/T4 is greater than about 5. FIGS. 5-7 provide additional information related to optical transmittance values of an optical stack, and will be discussed in more detail elsewhere herein.

Turning now to the figures, FIG. 1 provides a cross-sectional view of a display and backlight assembly, in accordance with an embodiment described herein. A display 400 includes a display panel 300 disposed on backlight 200, and configured to received light emitted by backlight 200. Backlight 200 provides illumination to display panel 300 and includes an optical stack 100, an optical reflector 70, and at least one light source 90. The optical reflector 70 is disposed adjacent optical stack 100 and an optical cavity 80 is defined between optical reflector 70 and optical stack 100. The optical reflector 70 is configured to reflect at least 80% of light for each of the first and second polarization states and for each wavelength in a predetermined wavelength range. In some embodiments, the predetermined wavelength range may extend at least from about 400 nm to about 600 nm. In some embodiments, the predetermined wavelength range may define a first wavelength range within the predetermined wavelength range, and a remaining wavelength range within the predetermined wavelength range. In some embodiments, the first wavelength range may extend from about 400 nm to about 480 nm, representing primarily blue wavelengths of light. In some embodiments, optical reflector 70 may be optimized for the first wavelength range (e.g., may substantially reflect wavelengths in the first wavelength range, and may substantially transmit or absorb wavelengths in the remaining wavelength range.) In some embodiments, light source 90 may be configured to emit light in the first wavelength range into optical cavity 80.

In some embodiments, optical stack 100 is configured for reflecting and transmitting light in a predetermined wavelength range, the predetermined wavelength range defining a first wavelength range and a remaining wavelength range. In some embodiments, optical stack 100 comprises a first optical film 40 and a second optical film 50. In some embodiments, first optical film 40 may be a reflective polarizer. In some embodiments, second optical film 50 may be a collimating multilayer optical film. In some embodiments, the second optical film 50 may be disposed between the first optical film 40 and the optical reflector 70.

In some embodiments, the first optical film 40 may be a hybrid reflective/absorbing polarizer. This may allow the elimination of an absorbing polarizer in the LCD panel in some embodiments, or increase the backlight polarization contrast ratio.

In some embodiments, optical stack 100 may include a bonding layer 60 disposed between, and bonding to each other, the first optical film 40 and the second optical film 50. In some embodiments, optical stack 100 may include an optical diffuser 110 stacked with the first optical film 40 and the second optical film 50. In some embodiments, the optical diffuser 110 may be disposed between first optical film 40 and the second optical film 50. In some embodiments, the bonding layer 60 disposed between first optical film 40 and the second optical film 50 may also be the optical diffuser 110.

In some embodiments, the optical diffuser 110 may be configured to diffused light more in the first wavelength range and less in the remaining wavelength range. In some embodiments, optical diffuser 110 may be a low-haze, low-clarity diffuser, such that light 120 exiting from optical stack 100 may still be at least partially collimated. For example, emitted light 120 may have a half angle divergence, a, of less than about 50 degrees from a line perpendicular to the surface of diffuser 110. In some embodiments, a bonding layer may be disposed between the optical stack 100 and the display panel 300. In some embodiments, the bonding layer may be an optically clear adhesive.

In some embodiments, backlight 200 may include at least one light source 90 which emits light in the first wavelength range. In some embodiments, the backlight 200 may not include any light source 90 which emits light in the remaining wavelength range into optical cavity 80. In some embodiments, at least one light source 90a may be disposed within an interior 81 of optical cavity 80 between the optical stack 100 and the optical reflector 70. In some embodiments, as least one light source 90b/90c may be disposed outside, and proximate a lateral side 82/83 of optical cavity 80.

In some embodiments, the optical stack 100 may have a thickness, H1, and the optical cavity may have a height, H2, defined as a distance between optical stack 100 and optical reflector 70, such that the ratio H2/(H1+H2) is greater than about 0.65.

In some embodiments, display 400 includes a display panel 300 disposed on backlight 200 and configured to receive light 120 emitted by backlight 200. In some embodiments, display panel 300 may include an in-cell polarizer layer 135. In some embodiments, a light-converting layer 137 may be disposed adjacent to in-cell polarizer layer 135. In some embodiments, the light-converting layer 137 may convert at least a portion of light having a first wavelength and received from the backlight to light having a different second wavelength. For example, in some embodiments, the light-converting layer 137 may convert at least about 80%, or at least about 85%, or at least about 90%, or at least about 95% of light having a first wavelength and received from the backlight to light having a different second wavelength. In some embodiments, light-converting layer 137 may convert a first portion of the received light (e.g., light of a blue wavelength) to light having a second wavelength (e.g., light of a red wavelength) different from the first wavelength, and converting a second portion of the received light (e.g., light of a blue wavelength) to light having a third wavelength (e.g., light of a green wavelength) different from the first and second wavelengths.

For example, in some embodiments, light-converting layer 137 may be patterned into smaller sections (i.e., light-converting elements) 137R, 137G, and 137B, representing individual red, green, and blue pixels in display panel 300, respectively. In some embodiments, incoming light 120 entering display panel 300 will include wavelengths of light substantially in the first wavelength range (e.g., a blue-wavelength range). When a blue wavelength enters an element 137R, the blue wavelength is absorbed by the element 137R and emitted as (i.e., converted to) a red wavelength. When a blue wavelength enters an element 137G, the blue wavelength is absorbed by the element 137G and emitted as (i.e., converted to) a green wavelength. In some embodiments, light-converting element 137R may contain or include a light-converting phosphor. In some embodiments, the light-converting phosphor in 137R may be a red phosphor. In some embodiments, light-converting elements 137R may contain or include light-converting quantum dots. In some embodiments, the light-converting quantum dots in 137R may include red quantum dots for converting blue light to red light. In some embodiments, light-converting element 137G may contain or include a light-converting phosphor. In some embodiments, the light-converting phosphor in 137G may be a green phosphor. In some embodiments, light-converting elements 137G may contain or include light-converting quantum dots. In some embodiments, the light-converting quantum dots in 137G may include green quantum dots for converting blue light to green light. In some embodiments, one or more of the light-converting elements 137 may include a mixture of quantum dots for converting blue light to white light.

In some embodiments, light-converting elements 137B may be clear (e.g., may not contain light-converting phosphors or quantum dots) as incoming light 120 may already substantially consist of wavelengths of light in the first wavelength range (i.e., may already be blue wavelengths). In some embodiments, light-converting elements 137B may be combined with a localized diffuser layer, so that blue light emitted from elements 137B is as diffuse as light emitted from elements 137R and 137G. As light passing through elements 137R and 137G is absorbed and re-emitted in a different wavelength, the light emitted by elements 137R and 137G already exhibits a level of diffusion (i.e., the light absorbed and re-emitted by the phosphors and/or quantum dots is broadcast in a diffuse pattern).

Figure 2:
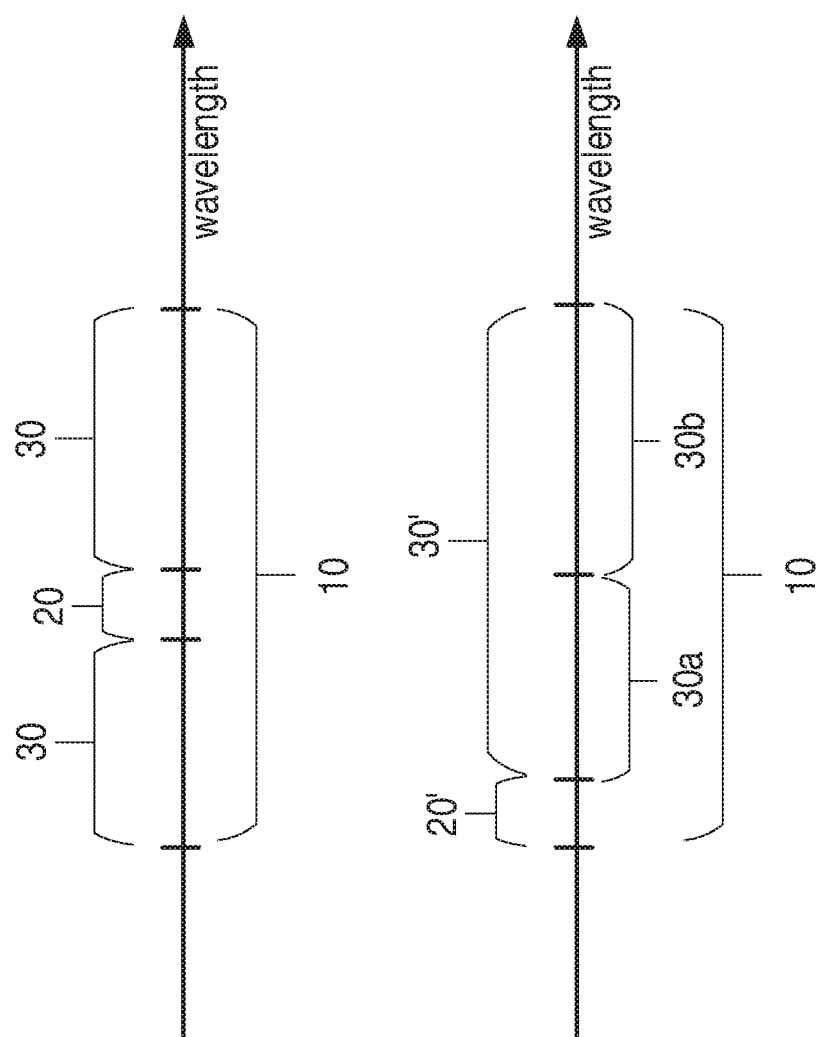
FIG. 2 is a diagram illustrating wavelength ranges applicable to the display of FIG. 1, in accordance with an embodiment of the present description.

FIG. 2 is a diagram illustrating various wavelength ranges applicable to the display 400 of FIG. 1, in accordance with an embodiment of the present description. In some embodiments, the optical stack 100 (FIG. 1) is configured to reflect and/or transmit light in predetermined wavelength range 10. In some embodiments, predetermined wavelength range 10 may extend from about 400 nm to about 600 nm. In some embodiments, predetermined wavelength range 10 may define a first wavelength range 20, and a remaining wavelength range 30. In some embodiments, as shown in the top portion of FIG. 2, remaining wavelength range 30 may be discontinuous, and may include the wavelengths of light from predetermined wavelength range 10 which are outside of first wavelength range 20.

In some embodiments, and as shown in the bottom portions of FIG. 2, a first wavelength range 20' may include a blue-wavelength range, and the remaining wavelength range 30' may include a green-wavelength range 30a and a red-wavelength range 30b. Various elements of display 400 (FIG. 1) may be optimized for first wavelength range 20' (e.g., may be optimized to function best with blue wavelengths of light, such as the blue wavelengths emitted by light sources 90 of the embodiment shown in FIG. 1.)

Figure 3:
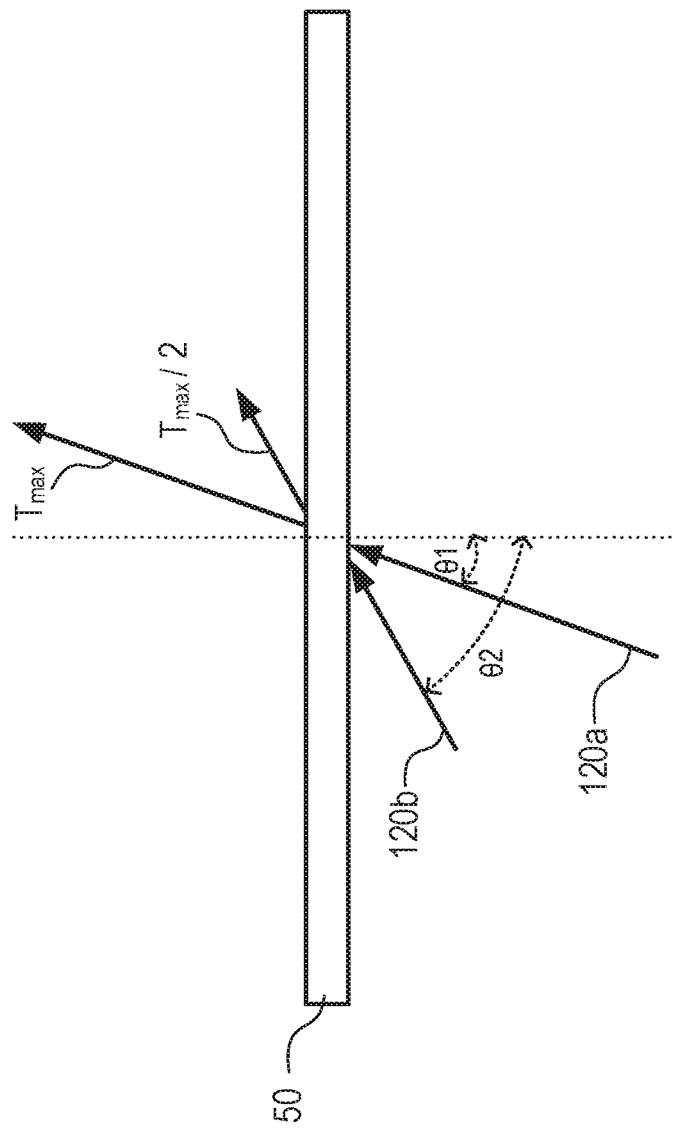
FIG. 3 is a diagram illustrating optical transmittance patterns for light incident on an optical film, in accordance with an embodiment of the present description.
Figure 8:
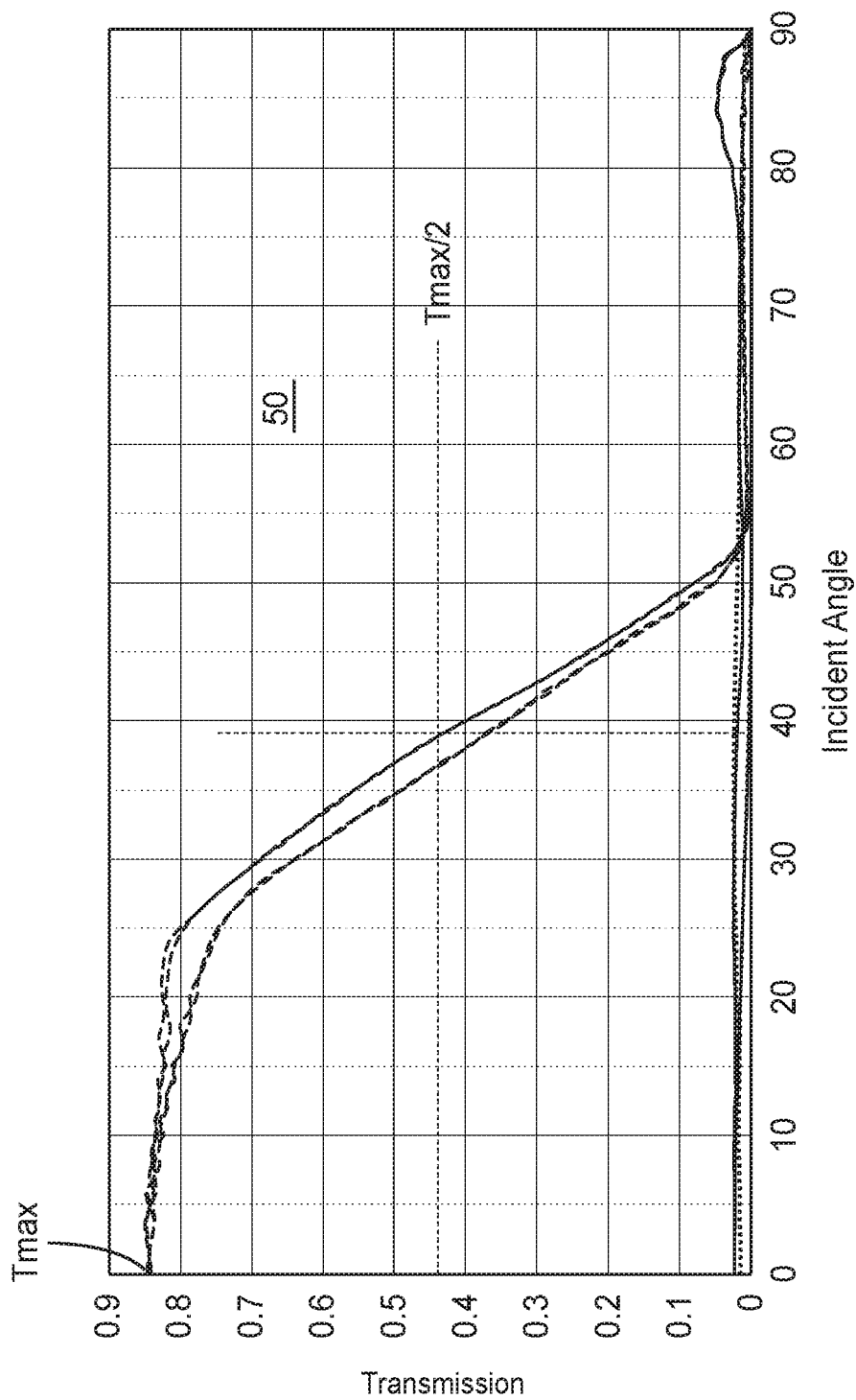
FIG. 8 illustrates optical transmittance values for light incident on an optical film at various angles of incidence, in accordance with an embodiment of the present description.

FIG. 3 is a diagram illustrating optical transmittance patterns for light incident on the second optical film 50 of FIG. 1, in accordance with an embodiment of the present description. In some embodiments, the second optical film 50 may be a collimating multilayer optical film. In some embodiments, for each of the first and second polarization states, and for each wavelength in the first wavelength range, the second optical film 50 has a maximum optical transmittance $T_{max}$ for light 120a incident at a first incident angle ($\theta 1$), and an optical transmittance $T_{max}/2$ for light 120b incident at a second incident angle ($\theta 2$) greater than the first incident angle by less than about 50 degrees. In some embodiments, $\theta 1$ may be about zero degrees, $\theta 2$ may be less than about 45 degrees, and $T_{max}$ may be greater than about 70%. FIG. 8 shows a plot of optical transmission values versus angle of incidence for an example embodiment of the second optical film 50. Additional discussion of FIG. 8 is presented elsewhere within this specification.

Figure 4A:
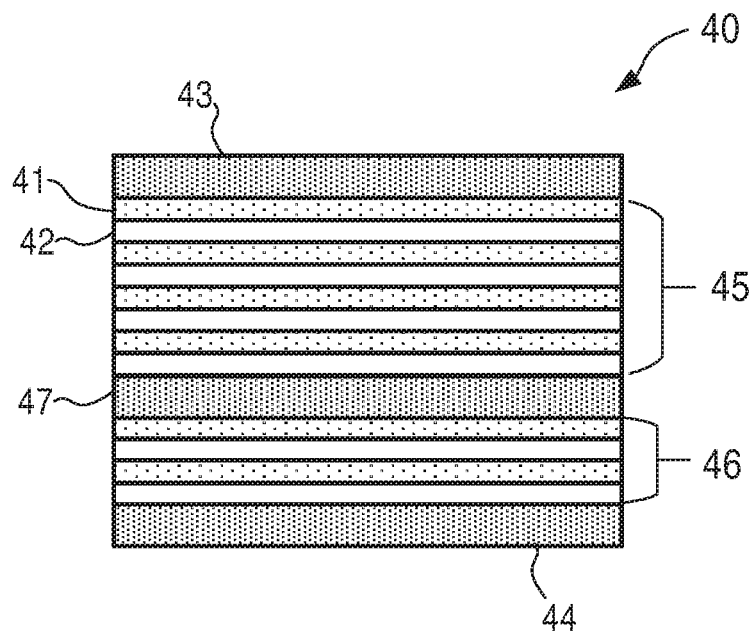
FIGS. 4A and 4B illustrate first and second optical films, respectively, in accordance with an embodiment of the present description.
Figure 4B:
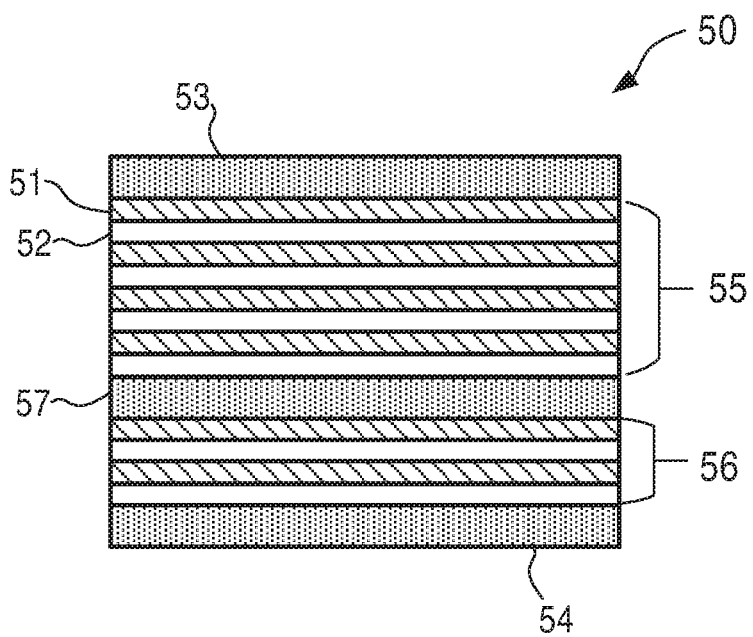

In some embodiments, the first and second optical films may each be constructed from a plurality of layers of polymeric materials. FIGS. 4A and 4B illustrate embodiments of the first and second optical films, respectively. FIG. 4A shows an embodiment of the first optical film 40, including a plurality of alternating first polymeric layers 41 and second polymeric layers 42. In some embodiments, the combined alternating first 41 and second 42 polymeric layers may number between 100 and 700. In some embodiments, each first 41 and second 42 polymeric layer may have an average thickness less than about 500 nm, or less than about 400 nm, or less than about 300 nm, or less than about 200 nm, or less than about 100 nm.

In some embodiments, for each pair of adjacent first 41 and second 42 polymeric layers: in planes of the first 41 and second 42 polymeric layers, the first 41 and second 42 polymeric layers may have respective indices of refraction, nix and n2x, along the first polarization state, n1y and n2y along the second polarization state, and n1z and n2z along a z-axis orthogonal to the first and second polarization states, such that for at least one wavelength in the predetermined wavelength range: nix is greater than each of n1y and n1z by at least 0.2, a difference between n1y and n1z is less than about 0.05, a maximum difference between n2x, n2y and n2z is less than about 0.01, and a difference between nix and n2x is greater than about 0.2.

In some embodiments, the first optical film 40 may include a top skin layer 43 and a bottom skin layer 44 disposed on opposite top and bottom sides of the plurality of alternating first 41 and second 42 polymeric layers, respectively. In some embodiments, each skin layer 43/44 may have a thickness greater than about 5 microns. In some embodiments, the plurality of alternating first 41 and second 42 polymeric layers may be divided into a first plurality 45 of alternating first 41 and second 42 polymeric layers and a second plurality 46 of alternating first 41 and second 42 polymeric layers, where the first plurality 45 and the second plurality 46 are separated from each other by a spacer layer 47 having a thickness greater than about 1 micron.

FIG. 4B shows an embodiment of the second optical film 50, including a plurality of alternating first polymeric layers 51 and second polymeric layers 52. In some embodiments, the combined alternating first 51 and second 52 polymeric layers may number between 100 and 700. In some embodiments, each first 51 and second 52 polymeric layer may have an average thickness less than about 500 nm.

In some embodiments, for each pair of adjacent first 51 and second 52 polymeric layers: in planes of the first 51 and second 52 polymeric layers, the first 51 and second 52 polymeric layers may have respective indices of refraction, nix and n2x, along the first polarization state, n1y and n2y along the second polarization state, and n1z and n2z along a z-axis orthogonal to the first and second polarization states, such that for at least one wavelength in the predetermined wavelength range: each of nix and n1y is greater than n1z by at least 0.1, a difference between nix and nix is less than about 0.05, a maximum difference between n2x, n2y and n2z is less than about 0.01, and a difference between n1x and n2x is greater than about 0.2.

In some embodiments, the second optical film 50 may include atop skin layer 53 and a bottom skin layer 54 disposed on opposite top and bottom sides of the plurality of alternating first 51 and second 52 polymeric layers. In some embodiments, each skin layer 53/54 may have a thickness greater than about 5 microns. In some embodiments, the plurality of alternating first 51 and second 52 polymeric layers may be divided into a first plurality 55 of alternating first 51 and second 52 polymeric layers and a second plurality 56 of alternating first 51 and second 52 polymeric layers, where the first plurality 55 and the second plurality 56 are separated from each other by a spacer layer 57 having a thickness greater than about 1 micron.

FIGS. 5, 6, and 7 show the optical transmission percentage values for blue, green, and red wavelengths of light, respectively, at various angles of incidence of an embodiment of the optical stack of the present description. FIG. 5 illustrates the transmission of an example optical stack, such as the optical stack of FIG. 1, for blue wavelengths of light, and specifically for wavelengths extending from about 425 nm to about 475 nm. FIG. 6 illustrates the transmission of an example optical stack for green wavelengths of light, and specifically for wavelengths extending from about 525 nm to about 575 nm. FIG. 8 illustrates the transmission of an example optical stack for red wavelengths of light, and specifically for wavelengths extending from about 625 nm to about 675 nm.

Returning to FIG. 5, it is shown that, in some embodiments of an optical stack, for each wavelength in a blue wavelength range extending from about 425 nm to about 475 nm, the optical stack may have a maximum optical transmittance, T1, for substantially zero incident angle, and an optical transmittance, T1/2, for light incident at less than about 45 degrees for light of the second polarization state, $P_y$. For light of the first polarization state, $P_x$, in some embodiments, the optical stack has a maximum optical transmittance T2 for incident angles from about zero to about 70 degrees, such that T1/T2 is greater than about 5. In some embodiments, the ratio of T1/T2 is greater than about 10.

Turning to FIGS. 6 and 7, it is shown that, in some embodiments of an optical stack, for each wavelength in each of a green wavelength range extending from about 525 nm to about 575 nm (FIG. 6) and a red wavelength range extending from about 625 nm to about 675 nm (FIG. 7) and for each of the first and second polarization states, $P_x$ and $P_y$, the optical stack has a maximum optical transmittance (T3 for green wavelengths, FIG. 6, T4 for red wavelengths, FIG. 7) less than a value, TT, for incident angles from about zero degree to about 70 degrees, such that the ratio of maximum optical transmittance, T1, to TT may be greater than about 5. In some embodiments, the ratio of T1/TT may be greater than about 10.

As shown in FIG. 1, optical stack 100 may comprise a first optical film 40 and a second optical film 50. In some embodiments, the second optical film 50 may be a collimating multilayer optical film. Returning to FIG. 5, in some embodiments, for each wavelength in a wavelength range extending from about 425 nm to about 475 nm (i.e., blue wavelength range), the second optical film 50 may have an optical transmittance greater than about 80% for substantially zero incident angle, and an optical transmittance less than about 50% for light incident at less than about 45 degrees. In some embodiments, for each wavelength in each of a green wavelength range (FIG. 6), extending from about 525 nm to about 575 nm, and a red wavelength range (FIG. 7), extending from about 625 nm to about 675 nm, the second optical film may reflect at least 90% of light for incident angles from about zero degree to about 70 degrees.

FIG. 8 shows a plot of optical transmission values versus angle of incidence for an example embodiment of the second optical film 50. In some embodiments, for each of the first and second polarization states, Px and Py, and for each wavelength in the first wavelength range (e.g., blue wavelength range), the second optical film 50 has a maximum optical transmittance $T_{max}$, for light at a first incident angle (e.g., about zero degrees) and an optical transmittance $T_{max}/2$ at a second incident angle (e.g., about 45 degrees) greater than the first incident angle by less than about 50 degrees.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack for reflecting and transmitting light in a predetermined wavelength range extending at least from about 400 nm to about 600 nm, the predetermined wavelength range defining a first wavelength range in the predetermined wavelength range, and a remaining wavelength range in the predetermined wavelength range, the optical stack comprising stacked first and second optical films, such that:
   for substantially normally incident light and for each wavelength in at least the first wavelength range, the first optical film reflects at least 80% of light having a first polarization state and transmits at least 80% of light having an orthogonal second polarization state; and
   for each of the first and second polarization states:
   for each wavelength in the first wavelength range, the second optical film has a maximum optical transmittance Tmax for light incident at a first incident angle, and an optical transmittance Tmax/2 for light incident at a second incident angle greater than the first incident angle by less than about 50 degrees; and
   for each wavelength in a wavelength range extending from about 425 nm to about 475 nm, the second optical film has an optical transmittance greater than about 80% for substantially zero incident angle, and an optical transmittance less than about 50% for light incident at less than about 45 degrees; and
   for each wavelength in each of a green wavelength range extending from about 525 nm to about 575 nm and a red wavelength range extending from about 625 nm to about 675 nm, the second optical film reflects at least 90% of light for incident angles from about zero degree to about 70 degrees.

2. The optical stack of claim 1, wherein the first wavelength range comprises a blue-wavelength range, and the remaining wavelength range comprises a green-wavelength range.

3. The optical stack of claim 1, wherein the first wavelength range extends from about 400 nm to about 480 nm.

4. The optical stack of claim 1, wherein for each wavelength in the predetermined wavelength range, the first optical film reflects at least 80% of light having the first polarization state and transmits at least 80% of light having the second polarization state.

5. The optical stack of claim 1, wherein the second optical film comprises a plurality of alternating first and second polymeric layers numbering between 100 and 700, each first and second polymeric layer having an average thickness less than about 500 nm, for each pair of adjacent first and second polymeric layers:
   in planes of the first and second polymeric layers, the first and second polymeric layers have respective indices of refraction: n1x and n2x along the first polarization state, n1y and n2y along the second polarization state, and n1z and n2z along a z-axis orthogonal to the first and second polarization states, such that for at least one wavelength in the predetermined wavelength range:
   each of n1x and n1y is greater than n1z by at least 0.1;
   a difference between n1x and n1x is less than about 0.05;
   a maximum difference between n2x, n2y and n2z is less than about 0.01; and
   a difference between n1x and n2x is greater than about 0.2.

6. A backlight for providing illumination to a display panel, comprising:
   the optical stack of claim 1;
   an optical reflector disposed adjacent the optical stack and defining an optical cavity therebetween, the optical reflector reflecting at least 80% of light for each of the first and second polarization states and for each wavelength in the predetermined wavelength range; and
   at least one light source configured to emit light in the first wavelength range into the optical cavity.

7. The backlight of claim 6, wherein the optical stack has a thickness H1, the optical cavity has a height H2 defined as a distance between the optical stack and the optical reflector, and H2/(H1+H2) is greater than about 0.65.

8. A display comprising a display panel disposed on the backlight of claim 6 and configured to receive light emitted by the backlight.

9. The display of claim 8, comprising a light-converting layer for converting at least a portion of light having a first wavelength and received from the backlight to light having a different second wavelength.

10. The display of claim 9, wherein the first wavelength is a blue wavelength and the second wavelength is a green wavelength or a red wavelength.

11. The display of claim 7 comprising a light-converting layer for receiving light having a first wavelength from the backlight and converting a first portion of the received light to light having a second wavelength different from the first wavelength, and converting a second portion of the received light to light having a third wavelength different from the first and second wavelengths.

12. The display of claim 11, wherein the first wavelength is a blue wavelength, the second wavelength is a green wavelength, and the third wavelength is a red wavelength.

13. The display of claim 11, wherein the light-converting layer comprises at least one of a light-converting green phosphor, a light converting red phosphor, and light-converting quantum dots.

14. A backlight for providing illumination to a display panel, the backlight configured to emit substantially linearly polarized blue light, the emitted light being substantially collimated having a half angle divergence of less than about 50 degrees such that:

light emitted by the backlight in a blue wavelength range extending from about 425 nm to about 475 nm and having a first polarization state has a maximum intensity T1 along a normal direction substantially normal to the backlight and a half angle divergence of less than about 45 degrees, light emitted by the backlight in the blue wavelength range having an orthogonal second polarization state and propagating within a first angular range making angles from about zero to about 70 degrees with respect to the normal direction, has a maximum optical transmittance T2, and for light for each of the first and second polarization states and propagating within the first angular range, the light has a maximum optical transmittance:

T3 for a green wavelength range extending from about 525 nm to about 575 nm, and T4 for a red wavelength range extending from about 625 nm to about 675 nm, wherein each of T1/T2, T1/T3 and T1/T4 is greater than about 5.

15. The backlight of claim 14, wherein the light emitted by the backlight has a first emitted light portion having a first polarization state (Px) and a first intensity, and a second emitted light portion having an orthogonal second polarization state (Py) and a second intensity, a ratio of the second intensity to the first intensity greater than about 10.

* * * * *

UNITED STATES PATENT AND TRADEMARK OFFICE
CERTIFICATE OF CORRECTION

| | | |
|---|---|---|
| PATENT NO. | : 11,829,024 B2 | Page 1 of 1 |
| APPLICATION NO. | : 17/435203 | |
| DATED | : November 28, 2023 | |
| INVENTOR(S) | : Gilles Jean-Baptiste Benoit et al. | |

It is certified that error appears in the above-identified patent and that said Letters Patent is hereby corrected as shown below:

In the Claims

Column 10,
Line 36, delete "a difference between n1x and n1x is less than about 0.05;" and insert -- a difference between nly and nlz is less than about 0.05; -- therefor.

Signed and Sealed this
First Day of October, 2024

Katherine Kelly Vidal
*Director of the United States Patent and Trademark Office*